(12) United States Patent
Min et al.

(10) Patent No.: US 8,073,510 B2
(45) Date of Patent: Dec. 6, 2011

(54) MOBILE COMMUNICATION TERMINAL

(75) Inventors: Kyung Jin Min, Seoul (KR); Jae Woo Lee, Seoul (KR)

(73) Assignee: Samkwang Ind Co., Ltd., Gyungnam (KR)

( * ) Notice: Subject to any disclaimer, the term of this patent is extended or adjusted under 35 U.S.C. 154(b) by 779 days.

(21) Appl. No.: 12/130,035

(22) Filed: May 30, 2008

(65) Prior Publication Data

US 2009/0069059 A1     Mar. 12, 2009

(30) Foreign Application Priority Data

Sep. 10, 2007 (KR) .................. 10-2007-0091773
Sep. 10, 2007 (KR) .................. 10-2007-0091774

(51) Int. Cl.
*H01H 3/42* (2006.01)

(52) U.S. Cl. ............... 455/575.4; 455/575.1; 349/58

(58) Field of Classification Search ............ 455/575.4, 455/575.1; 349/58; 362/633
See application file for complete search history.

(56) References Cited

U.S. PATENT DOCUMENTS

2006/0073858 A1*  4/2006  Nagashima ............ 455/575.4
2007/0046854 A1*  3/2007  Doui ......................... 349/58

* cited by examiner

*Primary Examiner* — Phuoc Doan
(74) *Attorney, Agent, or Firm* — Saliwanchik, Lloyd & Eisenschenk

(57) ABSTRACT

Provided is a mobile communication terminal including an upper plate secured to a rear surface of an upper frame and having a first coupling shaft to which one side of a driving link is secured such that the upper frame is vertically guided, a middle frame including a first guide provided at one side of a front surface thereof to guide the first coupling shaft of the upper plate, and first guide means provided at both sides of a rear surface thereof, and a main plate including a main frame secured to a rear surface thereof, sliding guide parts slidably guided along the first guide means of the middle frame at both sides thereof, a second coupling shaft provided at one side of a front surface thereof and to which the other side of the driving link is secured, and a support means for the middle frame installed at the other side of the front surface.

9 Claims, 15 Drawing Sheets

MOBILE COMMUNICATION TERMINAL

CROSS-REFERENCE TO RELATED APPLICATIONS

The present application claims the benefit under 35 U.S.C. §119 of Korean Patent Application Nos. 10-2007-0091773 and 10-2007-0091774, both filed on Sep. 10, 2007, which are hereby incorporated by reference in their entirety.

BACKGROUND OF THE INVENTION

1. Field of the Invention

The present invention relates to a mobile communication terminal, and more particularly, to a mobile communication terminal with improved performance and reduced overall size.

2. Background of the Related Art

In general, mobile communication devices include mobile phones, personal digital assistants (PDAs), smart phones, and so on, each of which includes a plurality of operation buttons and a display window.

A mobile phone, one type of mobile communication terminal, is classified as a bar type, a flip type, a folder type, a slide type, etc., depending on its design and the positions of its receiver and transmitter. In the early stages of the market for mobile phones, the bar type and the flip type were mainstream.

Currently, demands for various display functions and miniaturization have placed the folder type and the slide type in the mainstream.

Among these mainstream types of mobile phone, the slide type has various advantages such as being more convenient to operate than the folder type in which a folder should be opened to about 180° to speak over the phone and operate its buttons, and having a wide display window due to exposure of the display window to the exterior. Consequently, demand for the slide type has steadily increased, leading to the continuous introduction of various models onto the market.

A slide type phone mobile phone generally includes a lower body on which operation buttons (characters and numbers) are mounted, and an upper body having a display window and slidably coupled with the lower body.

However, since the upper body should include a navigation button (for moving a cursor in vertical and horizontal directions) in addition to the display window, it is difficult to increase the size of the display window.

In addition, to enlarge the display window, the upper body should be enlarged as well, which increases the overall size of the mobile phone and runs counter to efforts toward miniaturization.

BRIEF SUMMARY

The present invention provides a mobile communication terminal with improved performance and reduced overall size.

An exemplary embodiment of the present invention provides a mobile communication terminal including: an upper plate fixed to a rear surface of an upper frame and having a first coupling shaft to which one side of a driving link is fixed such that the upper frame is vertically guided; a middle frame including a first guide formed at one side of a front surface thereof to guide the first coupling shaft of the upper plate, and first sliding means provided at both sides of a rear surface thereof; and a main plate including a main frame fixed to a rear surface thereof, sliding guide parts slidably guided along the first guide means of the middle frame at both sides thereof, a second coupling shaft provided at one side of a front surface thereof and to which the other side of the driving link is fixed, and a support means for the middle frame installed at the other side of the front surface.

Here, a second sliding means may be provided to slide the upper plate, a fixing plate having an elongated hole formed at one side thereof in communication with the first guide of the middle frame may be fixed onto the front surface of the middle frame to vertically guide the first coupling shaft, a first key input part may be provided at a lower part of the middle frame, and a second key input part may be provided at a lower part of the main frame.

In addition, the second sliding means may include guide rails provided at both sides of the fixing plate fixed to the surface of the middle frame to correspond to rail coupling parts formed at both sides of the upper plate.

Further, the first sliding means may include sliding parts provided at both sides of the rear surface of the middle frame to correspond to the sliding guide parts formed at both sides of the main plate.

Meanwhile, the driving link may be fixed to the first coupling shaft of the upper plate at one side thereof, and fixed to the second coupling shaft of the main plate at the other side thereof, wherein the driving link is formed of a single driving link disposed between the middle frame and the main plate.

In addition, the support means may be a leaf spring having a resilient bending part formed at one end to be selectively supported by first and second stop grooves formed at both sides of a guide groove formed at one side of the rear surface of the middle frame.

Meanwhile, another exemplary embodiment of the present invention provides a mobile communication terminal including: a main plate to which a main frame forming a body is coupled; a middle frame coupled to the main plate to be slid in a longitudinal direction of the main frame, and having a first guide formed at one side thereof in the longitudinal direction and a second guide formed at a predetermined angle with respect to the first guide; an upper plate installed at a mounting part formed on an upper surface of the middle frame to be slid in the longitudinal direction of the middle frame; and a driving link hinged to the main plate at one end, and hinged to the upper plate at the other end, wherein a center part thereof is coupled to the second guide to move the middle frame to correspond to the movement direction of the upper plate upon movement of the upper plate.

Here, the driving link may include a first link installed at a lower side of the middle frame, and hinged to the first coupling shaft formed at the upper plate and passing through the first guide at one end to be rotated; and a second link hinged to the main plate at one side thereof, and coupled to the first link and the second guide at the other side thereof to be interlocked with the first link and move the middle frame.

In addition, the second link may have a pressing protrusion formed at the other side, and the pressing protrusion may be coupled to the second guide to move along the second guide and straightly move the middle frame using a rotation force of the second link.

Further, a first moving protrusion may be formed at the other side of the first link, and a second moving protrusion may be formed at the other side of the second link. The first and second moving protrusions may be coupled to second and first sliding grooves formed at center parts of the second link and the first link in the longitudinal direction thereof to move in the longitudinal direction and thereby vary the entire length of the first and second links.

In addition, an upper frame having a display part may be coupled to the upper plate, a first key input part may be installed at a lower side of the upper surface of the middle frame, and a second key input part may be installed at a lower side of the upper surface of the main frame The entire surface of the first key input part may be exposed to the exterior when open movement of the upper frame is completed, and the entire surface of the second key input part may be exposed to the exterior when open movement of the middle frame is completed.

Meanwhile, still another exemplary embodiment of the present invention provides a mobile communication terminal including: a main frame having number keys formed at one side thereof and forming a body of the terminal; a middle frame coupled to an upper surface of the main frame and slid in a longitudinal direction of the main frame; a first plate slidably coupled to a lower surface of the middle frame and connected to the main frame; an upper frame coupled to an upper surface of the middle frame, slid in a longitudinal direction of the middle frame, and having a display part installed at its upper surface; a second plate slidably coupled to the upper surface of the middle frame and connected to the upper frame; and a driving link connected to the second plate at one side thereof, and connected to the first plate at the other side thereof, wherein the driving link is disposed between the middle frame and the first plate to slide the frames with respect to each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1A:
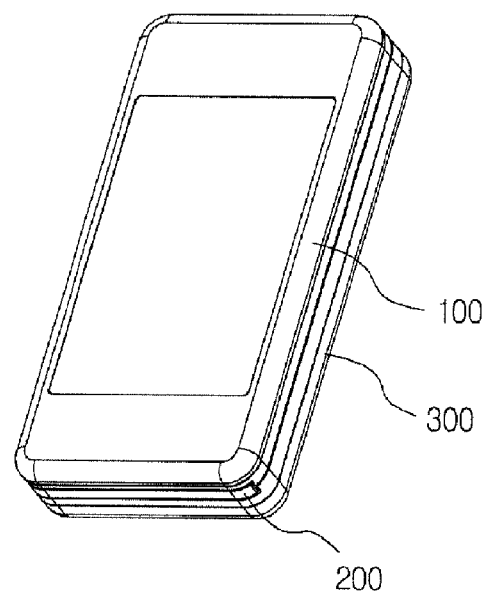
FIGS. 1A and 1B are perspective views showing a closed state and an opened state of a mobile communication terminal in accordance with an exemplary embodiment of the present invention, respectively.

In order to specifically describe the present invention such that it may be made by those skilled in the art, exemplary embodiments of the present invention will now be described in detail with reference to the accompanying drawings. Like reference numerals designate like components throughout the drawings and specification.

Hereinafter, a mobile communication terminal in accordance with an exemplary embodiment of the present invention will be described with reference to the accompanying drawings.

Figure 1B:
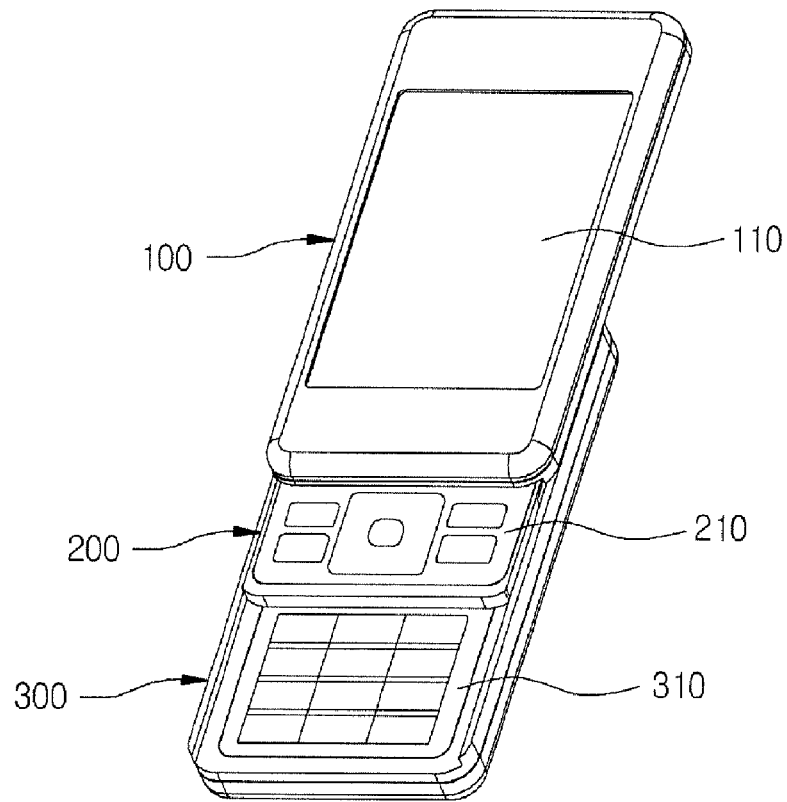

FIGS. 1A and 1B are perspective views showing a closed state and an opened state of a mobile communication terminal in accordance with an exemplary embodiment of the present invention, respectively.

As shown in FIGS. 1A and 1B, the mobile communication terminal in accordance with an exemplary embodiment of the present invention includes an upper frame 100, a middle frame 200, and a main frame 300.

Here, the upper frame 100 has a display part 110 provided at a front surface thereof. The display part 110 may be provided over the entire front surface of the upper frame 100, or may be provided with a predetermined margin at a periphery of the front surface of the upper frame 100.

In addition, the upper frame 100 may be slidably installed at the front surface of the middle frame 200, and a first key input part 210 may be provided at a lower part of the front surface of the middle frame 200 to operate a power supply and various functions.

Further, the middle frame 200 is slidably installed at the front surface of the main frame 300, and a second key input part 310 is provided at a lower part of the front surface of the main frame 300.

Meanwhile, the mobile communication terminal has a three-stage structure of the upper frame 100, the middle frame 200, and the main frame 300, which are slidable with respect to each other in a vertical direction. A half portion of the front surface of the middle frame 200 is fixedly inserted into a lower part of the upper frame 100.

In addition, a half portion of the rear surface of the middle frame 200 is fixedly inserted into an upper part of the main frame 300.

Therefore, in the slide type mobile communication terminal configured as a three-stage assembly, even though the upper frame 100 corresponding to a first stage and the middle frame 200 corresponding to a second stage are entirely slid upward, the frames 100, 200 and 300 corresponding to the first to third stages can be stably disposed.

Hereinafter, a process of sliding the mobile communication terminal having the three-stage structure of the upper frame 100, the middle frame 200, and the main frame 300 will be described.

First, the upper frame 100, as the first stage, is slid with respect to the main frame 300.

Then, after the upper frame 100 is entirely slid upward, the upper frame 100 and the middle frame 200 are slid upward together from the main frame 200.

As described above, in order to perform the two-stage sliding, the mobile communication terminal formed of the three-stages of frames 100, 200 and 300 may be implemented as a two-stage slide module in which a main plate 280 and an upper plate 220 are connected to the front and rear surfaces of the middle frame 200 disposed in the middle of the mobile communication terminal.

Figure 2:
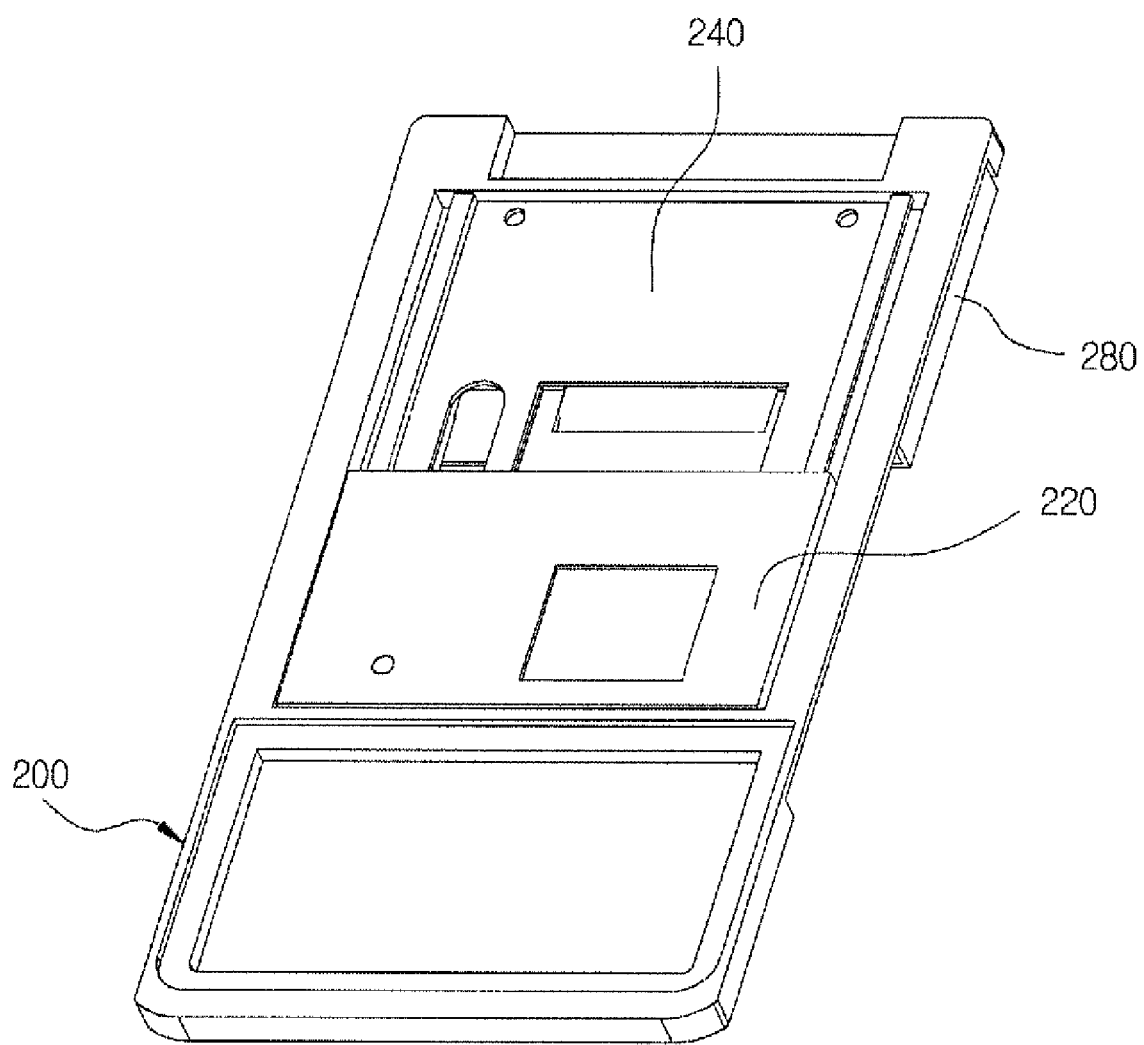
FIG. 2 is a perspective view of the front surface of a two-stage slide module of a mobile communication terminal in accordance with a first exemplary embodiment of the present invention.
Figure 3:
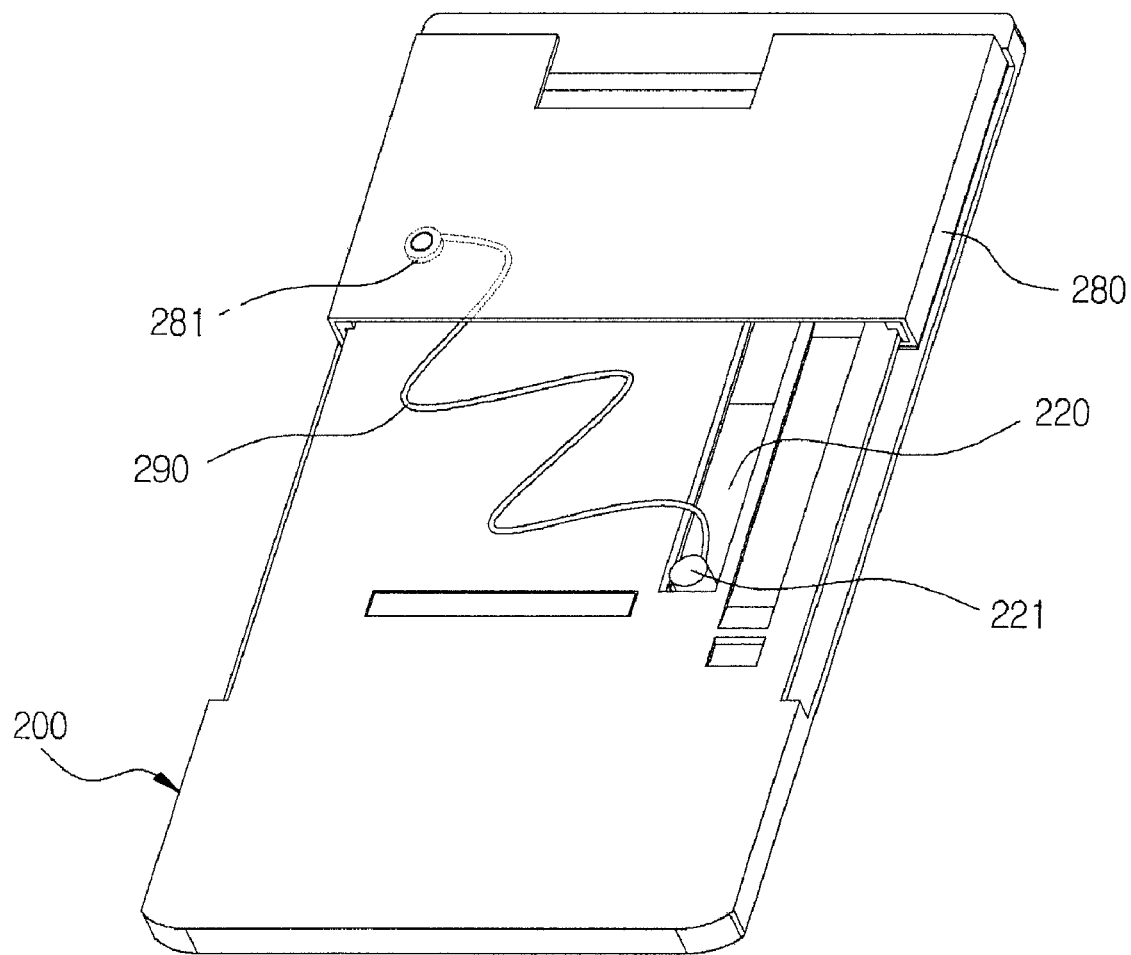
FIG. 3 is a perspective view of the rear surface of the two-stage slide module of the mobile communication terminal in accordance with a first exemplary embodiment of the present invention.
Figure 4:
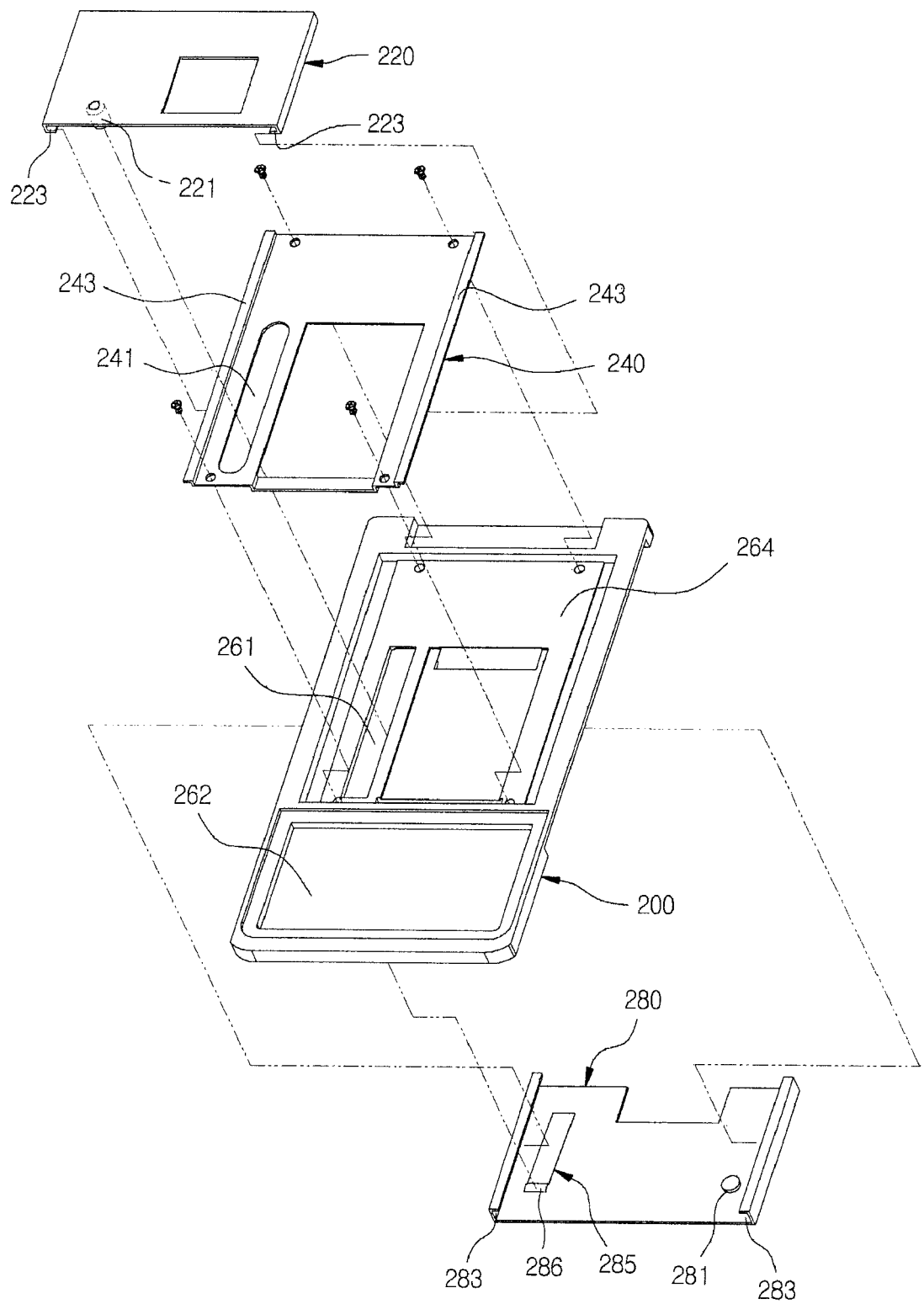
FIG. 4 is an exploded perspective view of the front surface of the two-stage slide module of the mobile communication terminal in accordance with a first exemplary embodiment of the present invention.
Figure 5:
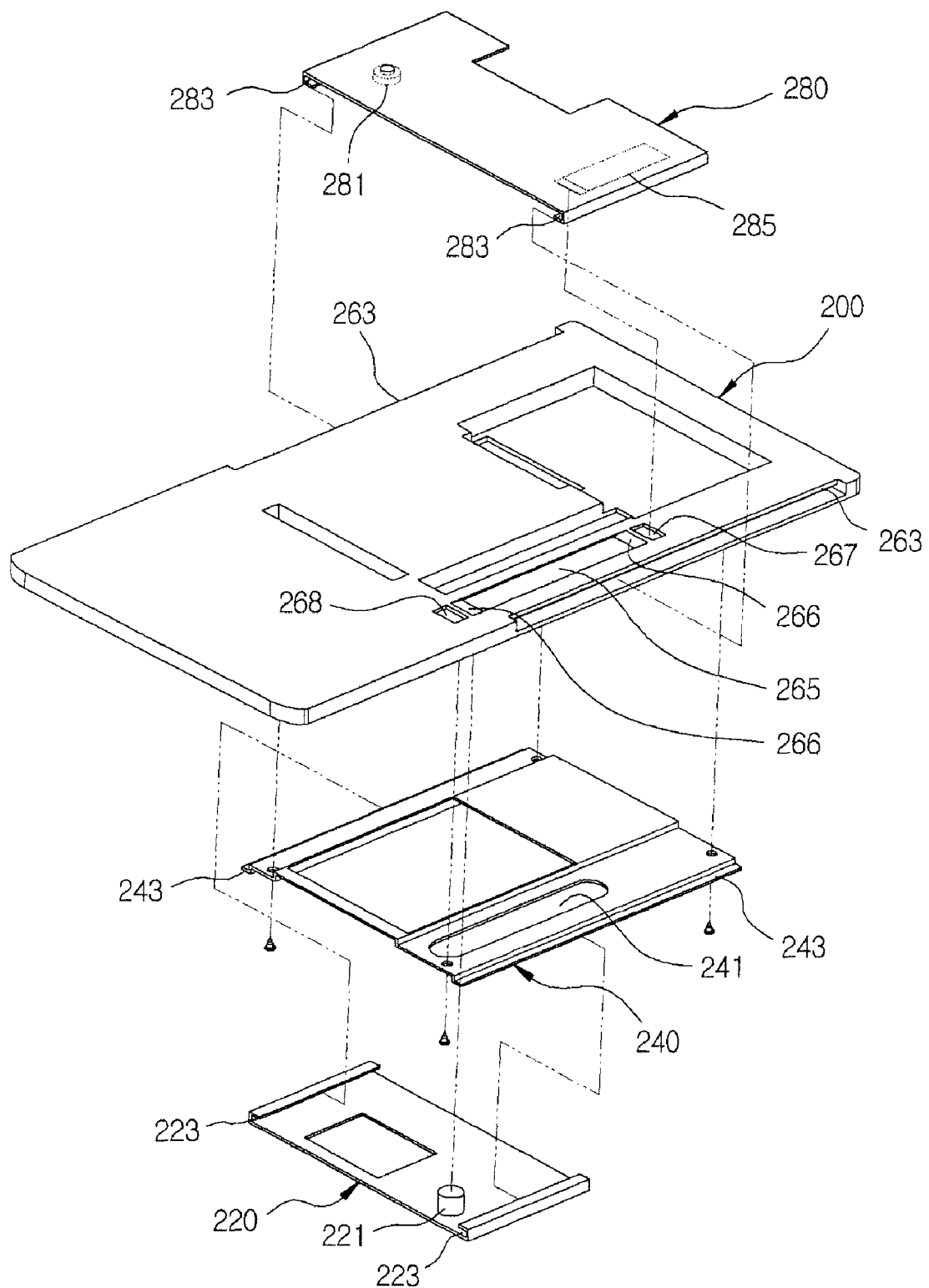
FIG. 5 is an exploded perspective view of the rear surface of the two-stage slide module of the mobile communication terminal in accordance with a first exemplary embodiment of the present invention.

FIGS. 2 and 3 are perspective views of the front surface and the rear surface of a two-stage slide module of a mobile communication terminal in accordance with a first exemplary embodiment of the present invention, FIG. 4 is an exploded perspective view of the front surface of the two-stage slide module of the mobile communication terminal in accordance with a first exemplary embodiment of the present invention, and FIG. 5 is an exploded perspective view of the rear surface of the two-stage slide module of the mobile communication terminal in accordance with a first exemplary embodiment of the present invention.

As shown in FIGS. 2 to 5, in the two-stage slide module of the mobile communication terminal in accordance with an exemplary embodiment of the present invention, an upper plate 220 and a main plate 280 are connected to the front and rear surfaces of a middle frame 200, respectively.

Here, preferably, the upper plate 220 is fixed to the rear surface of the upper frame 100 (see FIG. 1B), and has a first coupling shaft 221 to which one side of a driving link 290 is fixed such that the upper plate 220 can be vertically guided.

In addition, a first guide 261 is formed at one side of the front surface of the middle frame 200 to guide the first coupling shaft 221, and first sliding means are provided at both sides of the rear surface of the middle frame 200.

Here, the first sliding means may be sliding parts 263 provided at both sides of the rear surface of the middle frame 200 to correspond to sliding guide parts 283 formed at both sides of the main plate 280.

Meanwhile, the main frame 300 is fixed to the rear surface of the main plate 280, and the sliding guide parts 283 are formed at both sides of the main plate 280 to slide along the sliding part 263 of the middle frame 200.

In addition, the main plate 280 includes a second coupling shaft 281 provided at one side of the front surface thereof, to which the other side of the driving link 290 is fixed, and a support means 285 of the middle frame 200 is provided at the other side of the front surface.

Here, the support means 285 may be provided as a leaf spring 285 having a resilient bending part 286 that is selectively supported by first and second stop grooves 267 and 268 formed at both sides of a guide groove 265 provided at one side of the rear surface of the middle frame 200.

Here, slopes 266 are provided at both ends of the guide groove 265. As the middle frame 200 is vertically slid, the leaf spring 285 is selectively guided along the guide groove 265 to be selectively hooked by the first and second stop grooves 267 and 268 through the slopes 266.

As described above, the resilient bending part 286 of the leaf spring 285 is selectively hooked by the first and second stop grooves 267 and 268 through the slopes 266 to prevent movement of the middle frame 200 during sliding of the upper frame 100 when the mobile communication terminal is to be slid upward (see FIG. 2).

In addition, the leaf spring 285 and the first and second stop grooves 267 and 268 for preventing movement of the middle frame 200 during sliding of the upper frame 100 and the middle frame 200 may alternatively be provided as magnets (not shown) or conventional spring devices (not shown).

Meanwhile, a second guide means 243 is provided on the front surface of the middle frame 200 such that the upper plate 220 can slide.

In addition, a fixing plate 240 having an elongated hole 241 in communication with the first guide 261 of the middle frame 200 is fixed to a mounting part 264 provided at one side of an upper part of the front surface of the middle frame 200 such that the first coupling shaft 221 can be vertically guided.

Here, the fixing plate 240 may be fixed to the mounting part 264 of the middle frame 200 by a fastening member. Moreover, the fixing plate 240 may be integrally provided at an upper part of the front surface of the middle frame 200.

In addition, the mounting part 264 is provided at the upper part of the front surface of the middle frame 200, and a key installation groove 262, in which the first key input part 210 (see FIG. 1) is installed, may be provided at a lower part of the front surface of the middle frame 200.

Further, both ends of the elongated hole 241 of the fixing plate 240 may have a semi-circular shape corresponding to the shape of the first coupling shaft 221 of the upper plate 220.

Furthermore, both ends of the first guide 261 formed at one side of the front surface of the middle frame 200 may also have a semi-circular shape corresponding to the shape of the first coupling shaft 221 of the upper plate 220, like the elongated hole 241.

Meanwhile, one side of the driving link 290 is fixed to the first coupling shaft 221 of the upper plate 220 and the other side of the driving link 290 is fixed to the second coupling shaft 281 of the main plate 280. Preferably, a single driving link 290 may be disposed between the middle frame 200 and the main plate 280.

In addition, the driving link 290 may be provided as a wave spring, which is bent several times. Therefore, a resilient force of the spring is stored or released such that the upper plate 220, the middle frame 200, and the main plate 280 can be interlocked and slid with respect to each other.

Here, the wave spring is a single-layered spring having a small thickness and a plurality of curved parts to prevent the concentration of stress in one portion.

In addition, the driving link 290 may be provided as a torsion spring (not shown) having a center coil part and fixing means such as fixing hooks formed at both ends, or may be provided as various link mechanisms that can store and release a resilient force.

As described above, the single driving link 290 is provided to readily control the sliding operation and simplify a two-stage slide structure, thereby remarkably increasing productivity of the mobile communication terminal.

In addition, the single driving link 290 is provided to miniaturize the two-stage slide module of the slide type mobile communication terminal having a three-stage structure, thereby realizing a compact mobile communication terminal.

Hereinafter, an operation state of the two-stage slide module in which each of the frames 100, 200 and 300 of the mobile communication terminal in accordance with the present invention is vertically slid will be described in detail.

Figure 6:
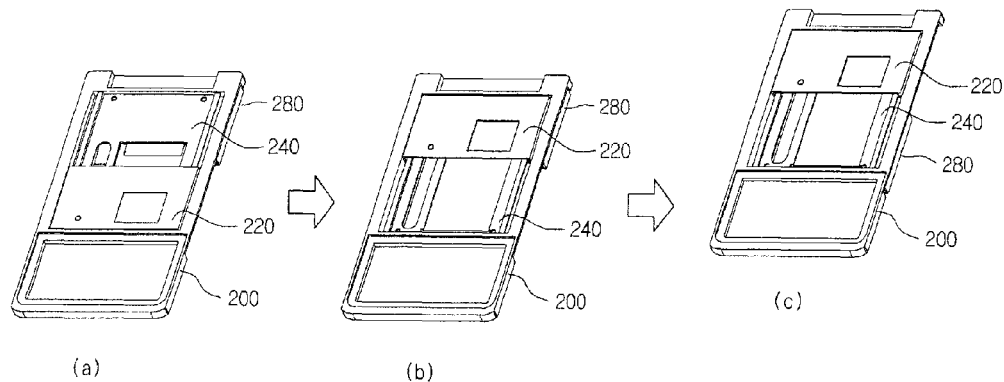
FIG. 6 is a view of an operation state of the front surface of the two-stage slide module, showing a state in which the mobile communication terminal in accordance with a first exemplary embodiment of the present invention is opened.
Figure 7:
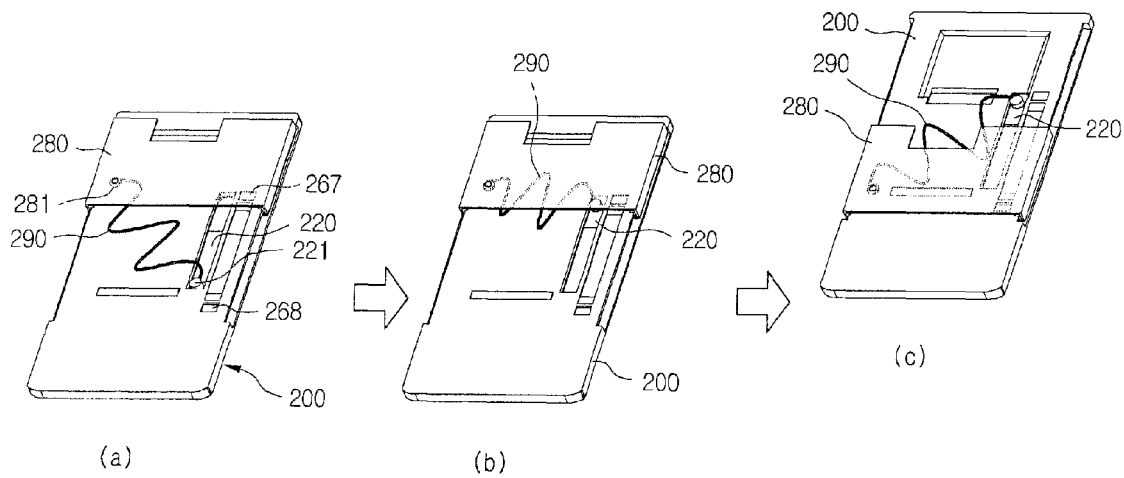
FIG. 7 is a view of an operation state of the rear surface of the two-stage slide module, showing a state in which the mobile communication terminal in accordance with a first exemplary embodiment of the present invention is opened.
Figure 8:
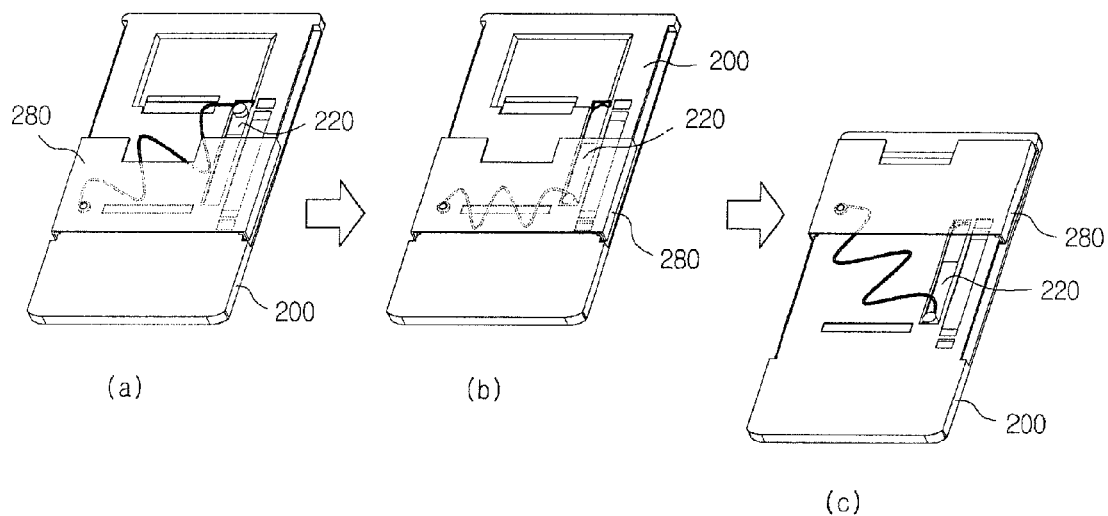
FIG. 8 is a view of an operation state of the rear surface of the two-stage slide module, showing a state in which the mobile communication terminal in accordance with a first exemplary embodiment of the present invention is closed.

FIG. 6 is a view of an operation state of the front surface of the two-stage slide module, showing a state in which the mobile communication terminal in accordance with a first exemplary embodiment of the present invention is opened, FIG. 7 is a view of an operation state of the rear surface of the two-stage slide module showing a state in which the mobile communication terminal in accordance with a first exemplary embodiment of the present invention is opened, and FIG. 8 is a view of an operation state of the rear surface of the two-stage slide module showing a state in which the mobile communication terminal in accordance with a first exemplary embodiment of the present invention is closed.

First, the two-stage slide module of the mobile communication terminal in accordance with the present invention includes a main plate 280 and an upper plate 220, in addition to the upper frame 100, the middle frame 200, and the main frame 300 of the three-stage mobile communication terminal. The mobile communication terminal will now be described with reference to FIGS. 6 and 7, in addition to FIGS. 1A, 1B and 2.

As shown in FIGS. 6 and 7, in the operation state of the two-stage slide module in which the mobile communication terminal in accordance with the present invention is opened, first, when the upper frame 100 is pushed upward, the upper plate 220 fixed to the rear surface of the upper frame 100 is slid upward.

Here, the upper frame 100 is slid until the first coupling shaft 221 of the upper plate 200 is guided by the elongated hole 241 of the fixing plate 240 and the first guide 261 of the middle frame 200 to move upward such that the first coupling shaft 221 arrives at upper ends of the elongated hole 241 and the first guide 261.

Then, the upper frame 100 cannot slide upward any more, and the middle frame 200 is slid upward with the upper frame 100 by the first coupling shaft 221.

Here, the middle frame 200 is guided to the sliding parts 263 provided at both sides of the rear surface of the middle frame 200 along the sliding guide part 283 of the main plate 280 fixed to the rear surface of the middle frame 200 to be slid upward.

Here, the resilient bending part 286 of the leaf spring 285 provided at one side of the main plate 280 is separated from its position in a state in which the mobile communication terminal is closed, i.e., the first stop groove 267 of the middle frame 200, and is guided along the guide groove 265 and hooked by the second stop groove 268 through the slopes 266.

Through the above processes, the upper frame 100 and the middle frame 200 of the mobile communication terminal is slid upward to expose the display part 110, the first key input part 210, and the second key input part 310, thereby completing upward sliding of the mobile communication terminal.

Reviewing an operation of the driving link 290 in an operation state in which the mobile communication terminal is slid in a three-stage manner, both ends of the single driving link 290 are fixed to the first and second coupling shaft 221 and 281 to store and release a resilient force using the coupling shafts 221 and 281, so that the frames 100, 200 and 300 can be interlocked and slid.

An operation state of the rear surface of the two-stage slide module in which the mobile communication terminal in accordance with the present invention is closed will be described with reference to FIG. 8.

Since the state in which the mobile communication terminal in accordance with the present invention is opened has been described with reference to FIGS. 6 and 7, a detailed description thereof will not be repeated. The closed-state operation of the mobile communication terminal will now be described with reference to FIGS. 1A, 1B, 2 and 8.

First, in a state in which the mobile communication terminal is opened, the resilient bending part 286 of the leaf spring 285 of the main plate 280 fixed to the front surface of the main frame 300 is separated from the second stop groove 268 of the middle frame 200 such that the middle frame 200 is slid downward to be hooked by the first stop groove 267.

Therefore, in a state in which the upper frame 100 is slid upward, the upper frame 100 is slid downward with the middle frame 200.

As described above, the sliding guide part 283 of the main plate 280 is guided along the sliding parts 263 formed at both sides of the rear surface of the middle frame 200 to be slid downward, and the resilient bending part 286 of the leaf spring 285 is hooked by the first stop groove 267 of the middle frame 200 to complete primary sliding.

Then, the upper plate 220 fixed to the rear surface of the upper frame 100 is guided by the guide rails 243 of the fixing plate 240 fixed to an upper part of the front surface of the middle frame 200 to be slid downward so that the upper frame 100 in the closed state is slid.

The single driving link 290 of the mobile communication terminal in accordance with the present invention is disposed between the rear surface of the middle frame 200 and the front surface of the main plate 280 to readily control the sliding operation.

In addition, since the single driving link 290 is provided to remarkably reduce the thickness of the slide type mobile communication terminal, it is possible to implement a compact slide type mobile communication terminal.

Figure 9:
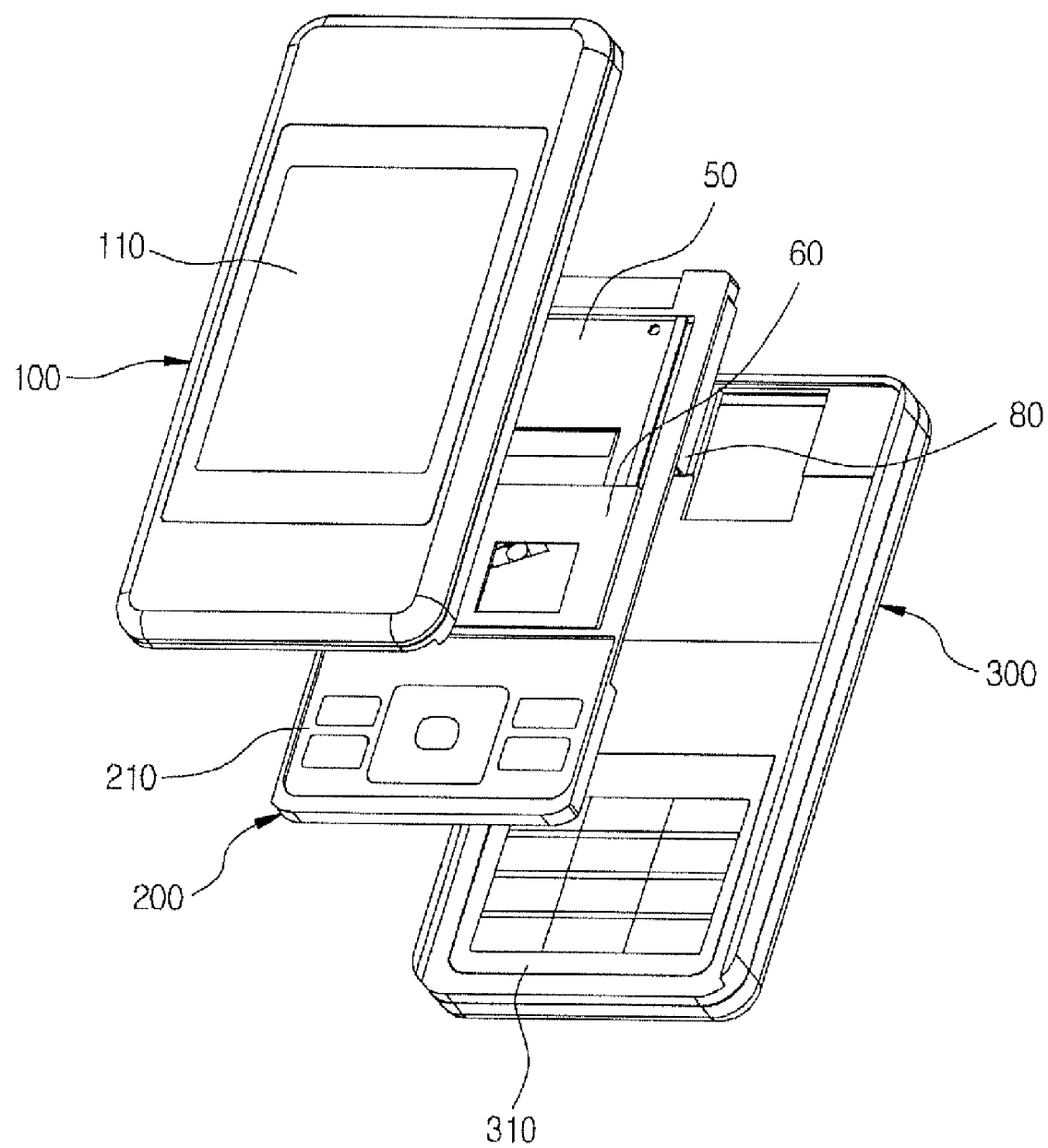
FIG. 9 is an exploded perspective view of a mobile communication terminal in accordance with a second exemplary embodiment of the present invention.

FIG. 9 is an exploded perspective view of a mobile communication terminal in accordance with a second exemplary embodiment of the present invention.

As shown in FIGS. 1A, 1B and 9, the mobile communication terminal includes an upper frame 100, a middle frame 200, and a main frame 300, which are connected to each other by link members.

The middle frame 200 is linked to be guided in the movement direction of the upper frame 100 so that the mobile communication terminal can be opened and closed by moving the upper frame 100 only.

More specifically, the upper frame 100 including a display part 110 installed at its front surface is coupled to an upper plate 60 slidably coupled to a fixing plate 50 installed at the front surface of the middle frame 200 to be slid in the longitudinal direction of the middle frame 200.

Here, a first key input part 210 may be installed at a lower side of the upper surface of the middle frame 200. The first key input part 210 may be formed of a navigation button part having functions of operating horizontal and vertical movement of a cursor.

In addition, a main plate 80 may be installed at a lower side of the middle frame 200 to be slid in the longitudinal direction of the middle frame 200, and the main frame 300 may be coupled to the main plate 80.

Further, a second key input part 310 may be installed at a lower side of the upper surface of the main frame 300. Here, the second key input part 310 may be formed of a main button part that functions to input characters, numbers, or the like.

Meanwhile, the middle frame 200 installed on the main frame 300 and the upper frame 100 installed on the middle frame 200 may be interlocked by a driving link, which will be described.

As a result, when the upper frame 100 is moved to an upper part and a lower part of the middle frame 200, the middle frame 200 can also be moved in the movement direction of the upper frame 100.

Therefore, when the upper frame 100 is opened upward on the middle frame 200, the middle frame 200 is also moved upward on the main frame 300 to open the mobile communication terminal.

Here, when the upper frame 100 is completely opened, the first key input part 210 is entirely exposed to the exterior, and at the same time, the second key input part 310 is entirely exposed to the exterior.

In addition, when the upper frame 100 is moved to a lower side of the middle frame 200, the middle frame 200 is also moved to a lower side of the main frame 300 to close the mobile communication terminal.

Here, the upper frame 100 may have a size corresponding to the size of the main frame 300, and the middle frame 200 may have a size equal to or smaller than those of the upper frame 100 and the main frame 300 to be disposed therebetween.

As described above, the display part 110, the first key input part 210, and the second key input part 310 are installed at the frames 100, 200 and 300, respectively, to minimize the sizes of the frames 100, 200 and 300. As a result, it is possible to maintain the compact size of the mobile communication terminal when the mobile communication terminal is closed.

Figure 10:
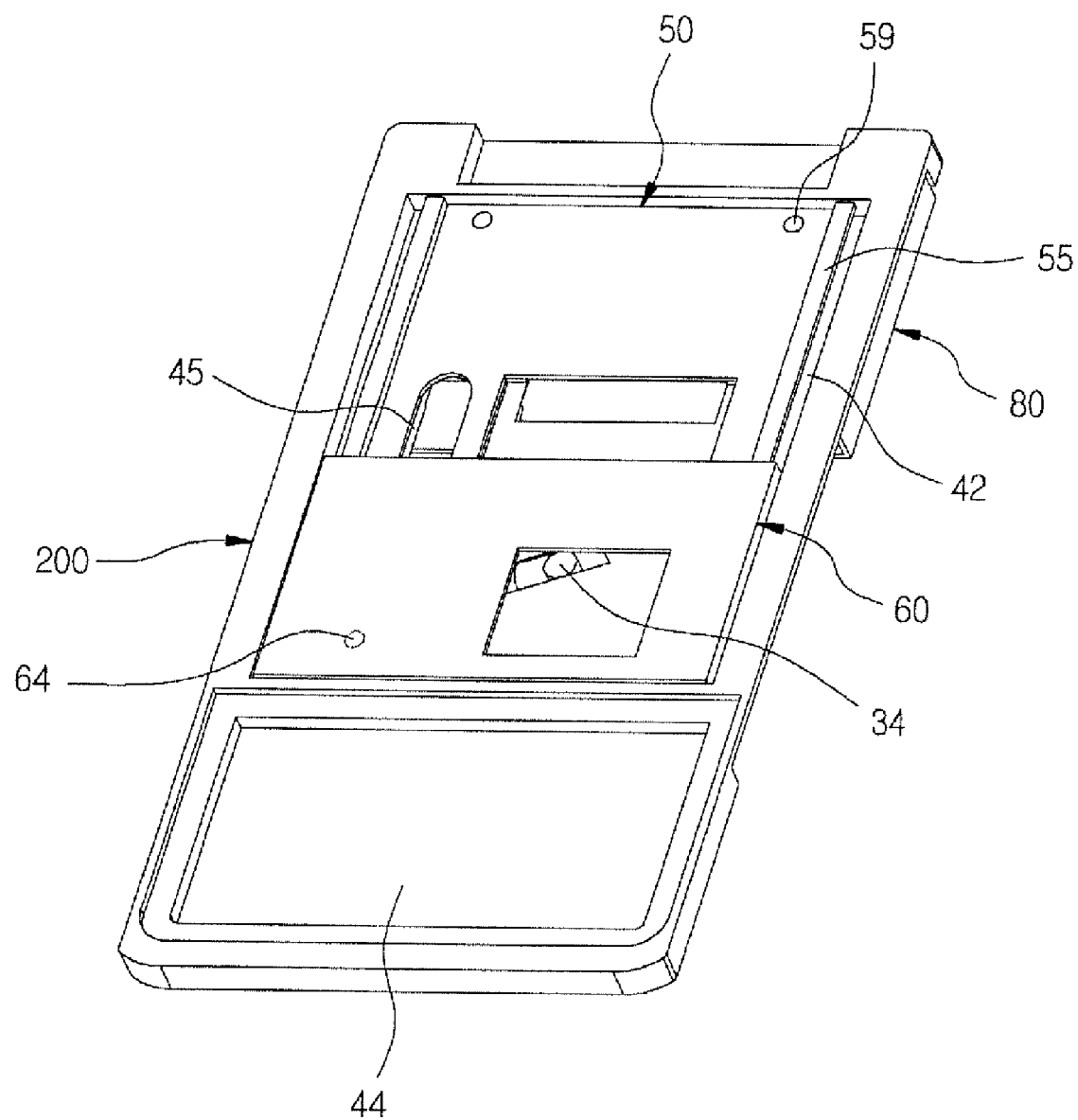
FIG. 10 is a front view showing a coupled state of the mobile communication terminal in accordance with a second exemplary embodiment of the present invention.
Figure 11:
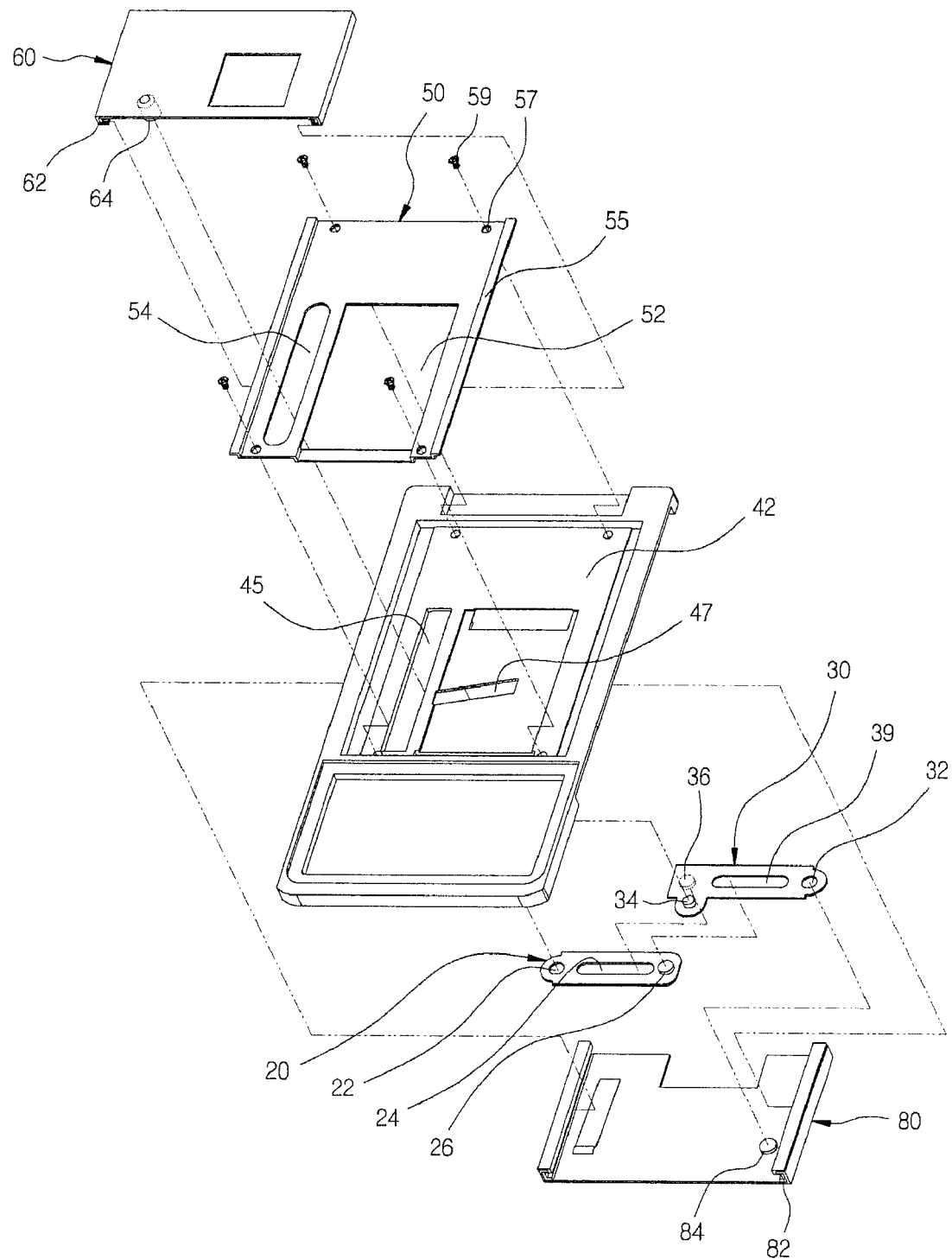
FIG. 11 is an exploded perspective view showing the front surface of the coupled state of the mobile communication terminal in accordance with a second exemplary embodiment of the present invention.
Figure 12:
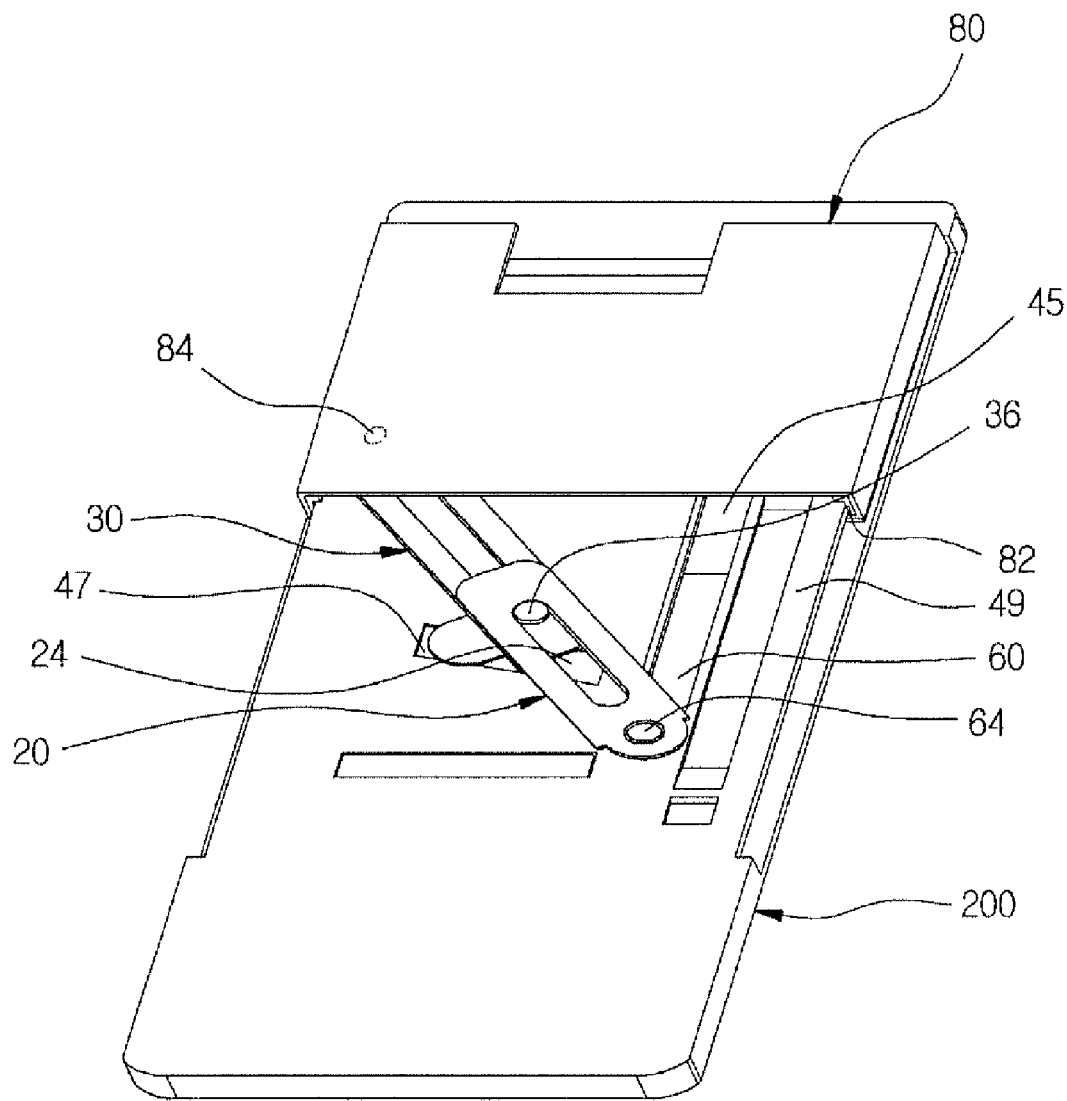
FIG. 12 is a bottom view showing the coupled state of the mobile communication terminal in accordance with a second exemplary embodiment of the present invention.
Figure 13:
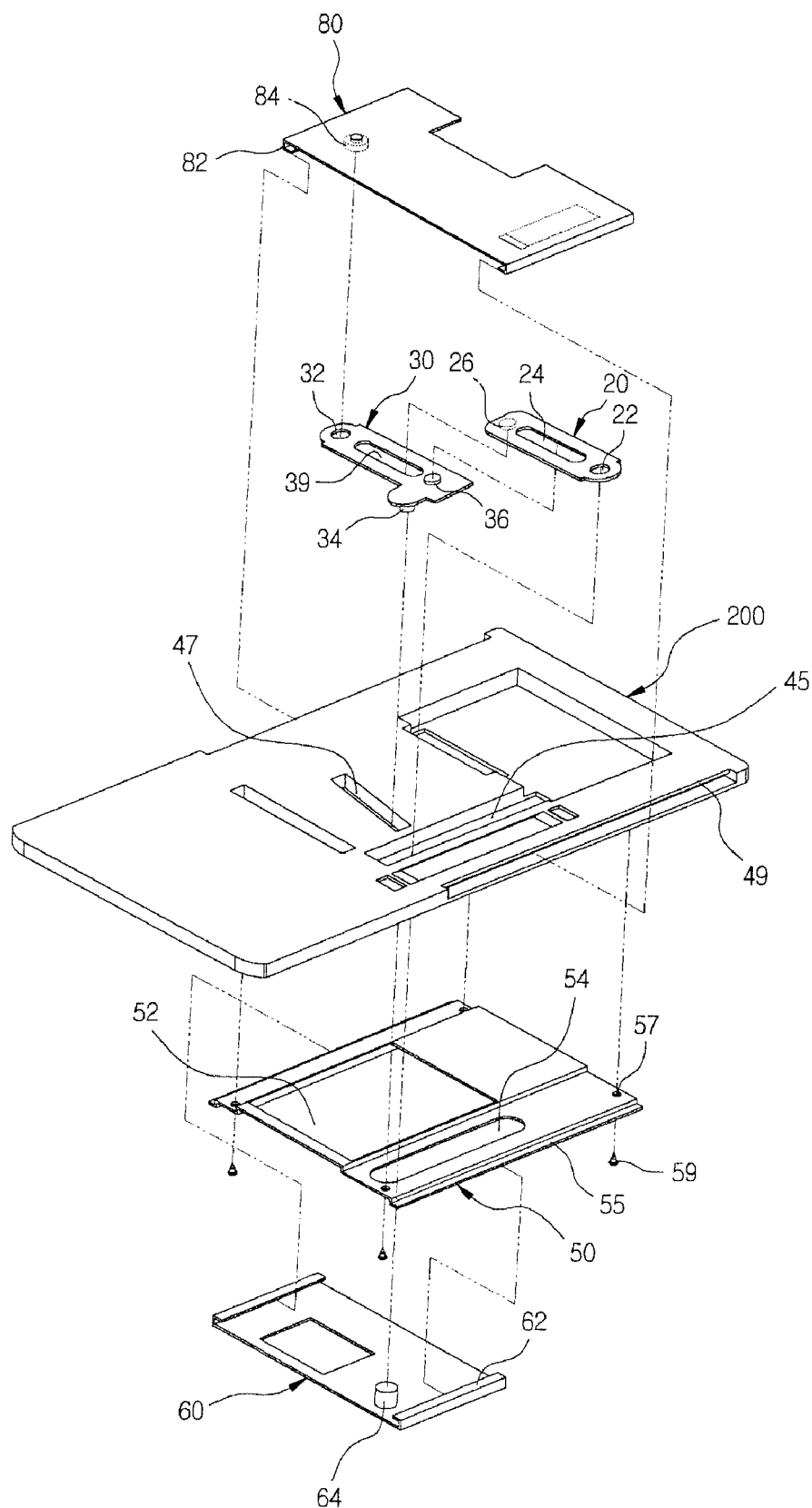
FIG. 13 is an exploded perspective view showing the rear surface of the coupled state of the mobile communication terminal in accordance with a second exemplary embodiment of the present invention.

FIG. 10 is a front view showing a coupled state of a mobile communication terminal in accordance with a second exemplary embodiment of the present invention, FIG. 11 is an exploded perspective view showing the front surface of the coupled state of the mobile communication terminal in accordance with a second exemplary embodiment of the present invention, and FIG. 12 is a bottom view showing the coupled state of the mobile communication terminal in accordance with a second exemplary embodiment of the present invention. And, FIG. 13 is an exploded perspective view showing the rear surface of the coupled state of the mobile communication terminal in accordance with a second exemplary embodiment of the present invention.

As shown in FIGS. 10 to 13, the mobile communication terminal may include a middle frame 200, an upper plate 60, a main plate 80, a fixing plate 50, and a driving link.

Here, a mounting part 42 may be formed at an upper part and a center part of the front surface of the middle frame 200, and a key installation groove 44 may be formed at a lower part of the front surface.

In addition, a first guide 45 is formed to pass through the mounting part 42 in the longitudinal direction of the middle frame 200, and a second guide 47 is formed to pass through the mounting part 42 at one side of the first guide 45 to form a predetermined angle.

Further, the fixing plate 50 may be fixed to the mounting part 42.

Here, an elongated hole 54 is formed at one side of the fixing plate 50 to correspond to the first guide 45, and a groove 52 is formed to include the second guide 47 such that the first guide 45 and the second guide 47 are not hidden by the fixing plates 50.

In addition, both ends of the fixing plates 50 are bent to form guide rails 55. Rail coupling parts 62 formed at both ends of the upper plate 60 are coupled to the guide rails 55 so that the upper plate 60 can be slid along the guide rails 55.

Further, the fixing plate 50, to which the upper plate 60 is fixed, may be fixed to the middle frame 200 by fastening members 59 coupled to the fixing plates 50 through a plurality of coupling holes 57 formed at the fixing plate 50. The fastening members 59 may be bolts.

Meanwhile, a first coupling shaft 64 may be formed at the upper plate 60.

Here, when the upper plate 60 is coupled to the fixing plate 50 to be installed at the middle frame 200, the first coupling shaft 64 is formed at a position where the first coupling shaft 64 can pass through the elongated hole 54 and the first guide 45, so that the first coupling shaft 64 can move along the first guide 45.

In addition, a driving link and a main plate 80 may be installed at a lower side of the middle frame 200.

Here, sliding guide parts 82 may be formed at both ends of the main plate 80, and sliding parts 49 formed at both ends of the rear surface of the middle frame 200 may be coupled to the sliding guide parts 82. As a result, the middle frame 200 is coupled to the main plate 80 to be slid in the longitudinal direction thereof.

Further, the driving link may be disposed between the middle frame 200 and the main plate 80. Here, the driving link may include a first link 20 and a second link 30.

Specifically, a first coupling hole 22 may be formed at one side of the first link 20 as a planar member to pass through the first link 20, a first sliding groove 24 may be formed in a center part of the first link 20 in the longitudinal direction thereof, and a first moving protrusion 26 may be formed at the other side of the first link 20.

Here, the first coupling hole 22 is hinged to the first coupling shaft 64 passing through the elongated hole 54 and the first guide 45 to extend to the rear surface of the middle frame 200.

As a result, the first link 20 can be rotated about the first coupling shaft 64.

In addition, an anti-separation member (not shown) having a larger diameter than the first coupling hole 22 may be further installed at an end of the first coupling shaft 64 to prevent the first coupling hole 22 from being separated from the first coupling shaft 64.

Meanwhile, a second coupling hole 32 may be formed at one side of the second link 30 as a planar member to be hinged to the second coupling shaft 84 formed at the main plate 80, a second sliding groove 39 may be formed in a center part of the second link 30 in the longitudinal direction thereof, and a second moving protrusion 36 may be formed at the other side of the second link 30.

Here, the second coupling shaft 84 is hinged to the second coupling hole 32, so that the second link 30 can be rotated about the second coupling shaft 84.

In addition, the first moving protrusion 26 may have a diameter corresponding to the width of the second sliding groove 39 to be inserted into the second sliding groove 39, and the first sliding groove 24 may also have a width corresponding to the diameter of the second moving protrusion 36 such that the second moving protrusion 36 is inserted thereinto.

As described above, the first moving protrusion 26 is connected to the second sliding groove 39, and the second moving protrusion 36 is connected to the first sliding groove 24, so that the second link 30 is connected to the first link 20.

In addition, it is possible to not only move the second link 30 in the longitudinal direction of the first link 20, but also to perform more stable connection and movement thereof.

Meanwhile, anti-separation member (not shown) having a larger diameter than the first and second moving protrusions 26 and 36 may be further installed at ends of the first moving protrusion 26 and the second moving protrusion 36 to prevent separation of the protrusions from the second and first sliding grooves 39 and 24.

Further, a pressing protrusion 34 may be formed at the other side of the second link 30 to be coupled to the second guide 47.

Here, the pressing protrusion 34 may have a diameter corresponding to the width of the second guide 47 to be inserted into the second guide 47 and move in the longitudinal direction of the second guide 47.

In addition, an anti-separation part (not shown) having a larger diameter than the width of the second guide 47 may be further installed at an end of the pressing protrusion 34 to prevent the pressing protrusion 34 from being separated from the second guide 47.

As a result, the second link 30 is connected to the middle frame 200 as well as the first link 20 to move the middle frame 200 depending on pivotal movement of the first link 20.

Figure 14:
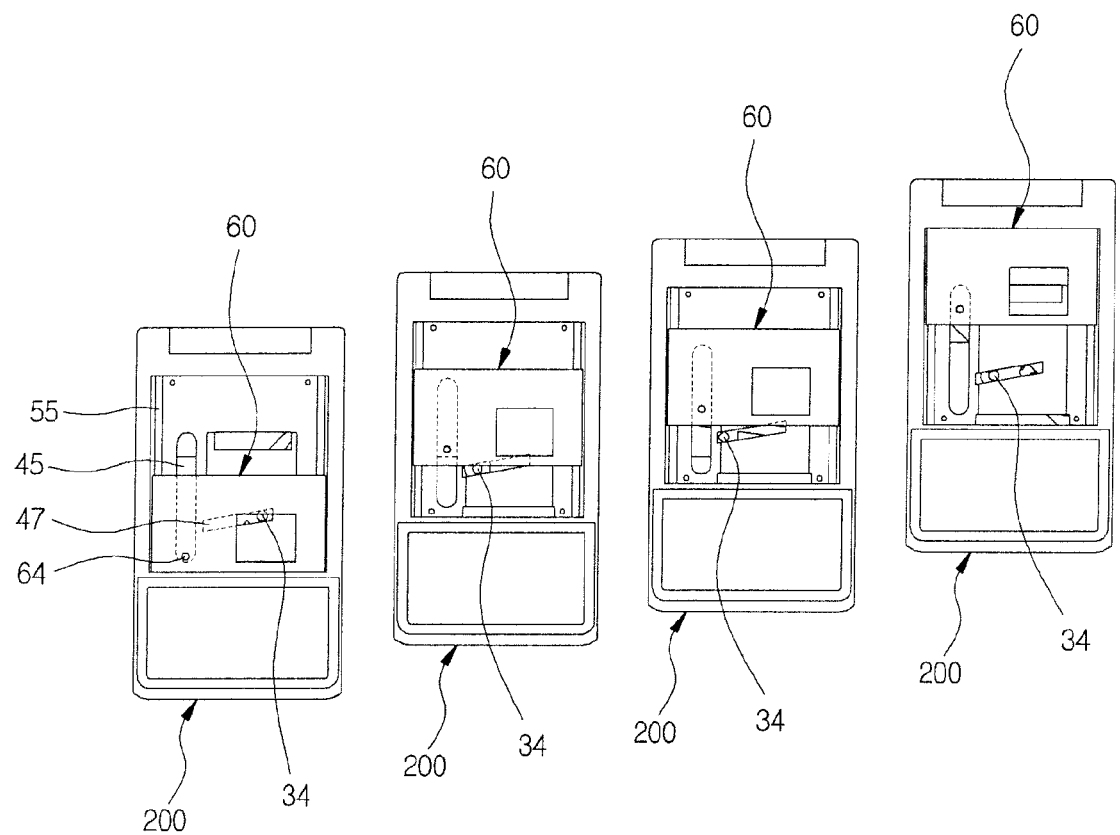
FIG. 14 is a view showing an operation state of the front surface of the mobile communication terminal in accordance with a second exemplary embodiment of the present invention.
Figure 15:
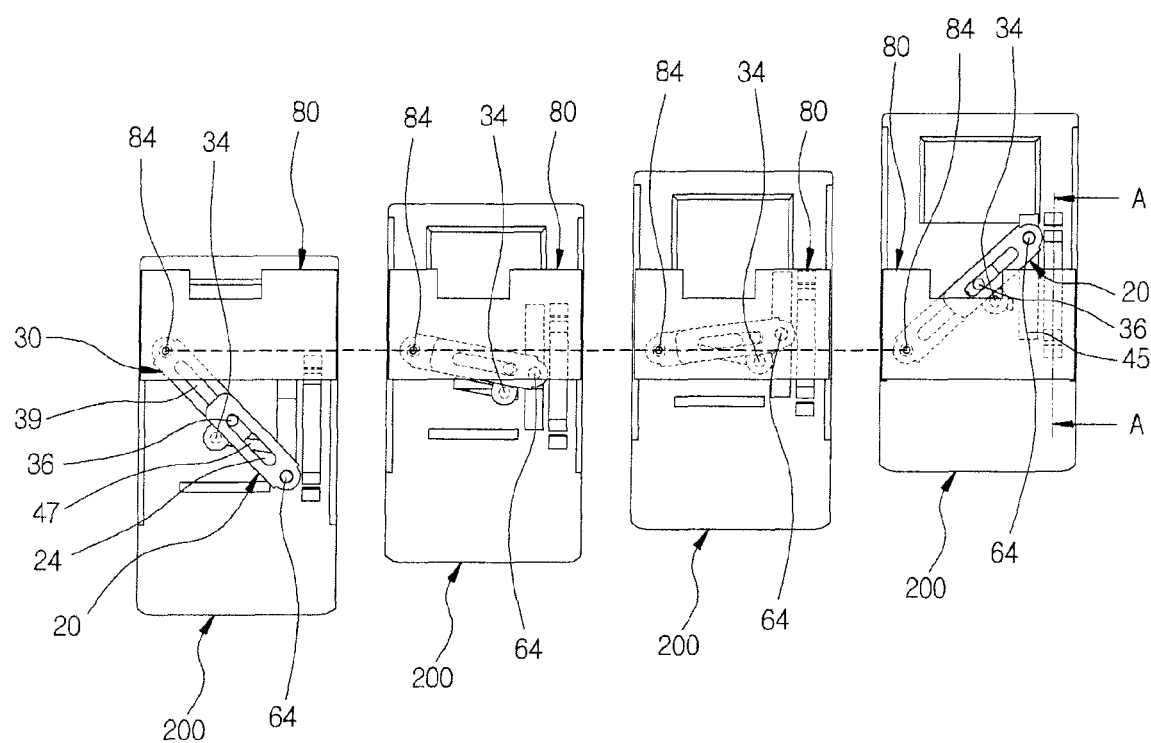
FIG. 15 is a view showing an operation state of the rear surface of the mobile communication terminal in accordance with a second exemplary embodiment of the present invention.
Figure 16:
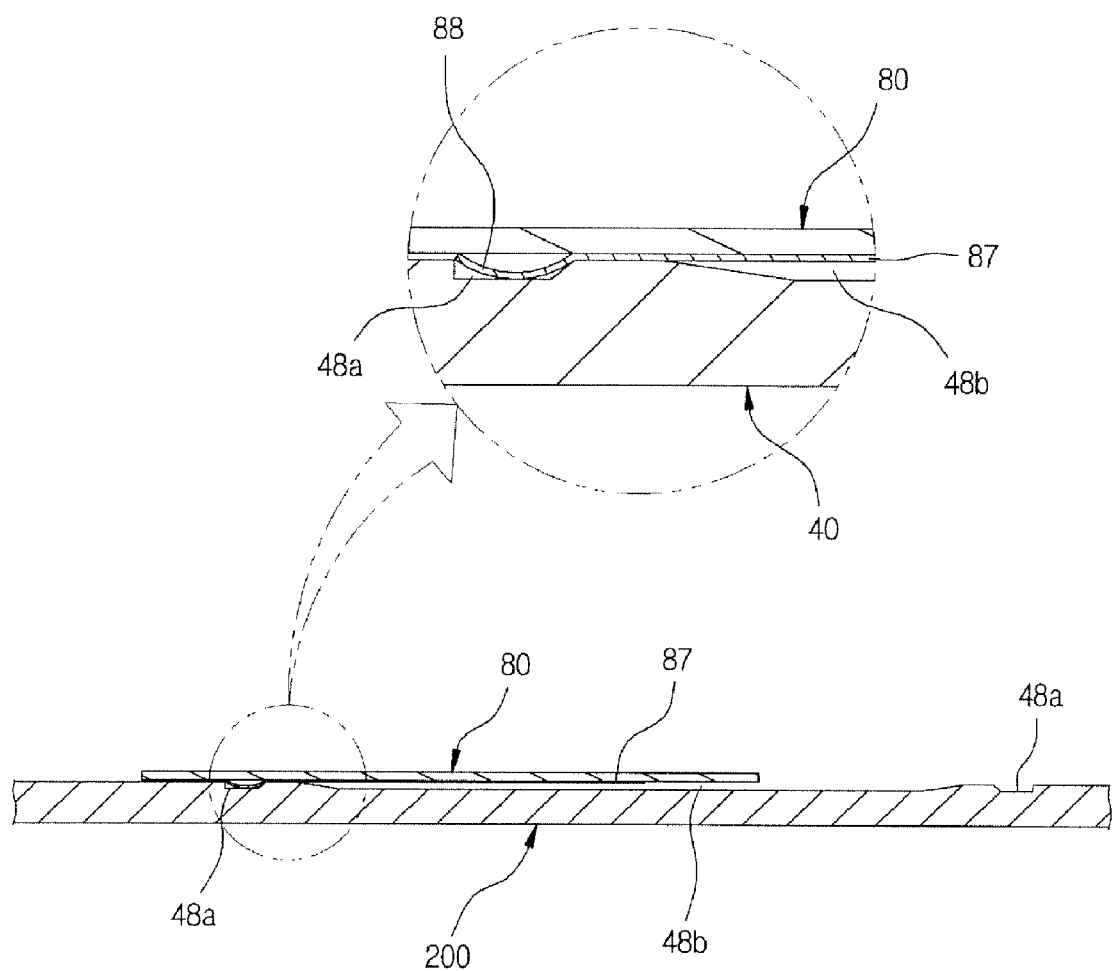
FIG. 16 is a cross-sectional view taken along line A-A of FIG. 15.

FIG. 14 is a view showing an operation state of the front surface of the mobile communication terminal in accordance with a second exemplary embodiment of the present invention, FIG. 15 is a view showing an operation state of the rear surface of the mobile communication terminal in accordance with a second exemplary embodiment of the present invention, and FIG. 16 is a cross-sectional view taken along line A-A of FIG. 15.

As shown in FIGS. 14 and 15, when the upper plate 60 is slid to an upper side of the middle frame 200 along the first guide rail 55, the first coupling shaft 64 moves upward along the first guide 45.

In addition, the first link 20 hinged to the first coupling shaft 64 also moves upward along the upper plate 60, and thus a gap between the first coupling shaft 64 and the second coupling shaft 84 is gradually reduced.

A straight-line distance between the first coupling shaft 64 and the second coupling shaft 84 is minimized when the first link 20 and the second link 30 are perpendicular to the first guide 45 as the first link 20 moves upward, and then increases as the upward movement of the first link 20 continues.

Therefore, the second moving protrusion 36 and the first moving protrusion 26 (see FIG. 13) coupled to the first sliding groove 24 and the second sliding groove 39 move along the first sliding groove 24 and the second sliding groove 39, respectively.

In addition, the entire length of the first link 20 and the second link 30 may be varied depending on the straight-line distance between the first coupling shaft 64 and the second coupling shaft 84 as the first and second link 20 and 30 move along the first and second sliding grooves 24 and 39.

Further, the second link 30 is rotated about the second coupling shaft 84 in the movement direction of the upper plate 60.

Furthermore, as the second link 30 is rotated upward, the pressing protrusion 34 presses the upper surface of the second guide 47 and moves in the longitudinal direction of the second guide 47.

In addition, upward rotation of the second link 30 pushes the middle frame 200 upward so that the middle frame 200 moves straight in the movement direction of the upper plate 60.

Meanwhile, when the upper plate 60 moved downward after movement of the upper plate 60, the first link 20 also moves downward with the upper plate 60, and the second link 30 connected to the first link 20 is rotated about the second coupling shaft 84 in the movement direction of the upper plate 60.

In addition, the pressing protrusion 34 presses a lower side of the second guide 47 and slides to move the middle frame 200 downward.

Here, a movement distance of the upper plate 60 corresponds to a position at which the entire surface of the first key input part 210 (see FIG. 1B) is seen when upward movement of the upper plate 60 is completed.

Further, a movement distance of the upper plate 60 may be determined when a lower end of the upper frame 100 (see FIG. 1B) corresponds to a position of a lower end of the main frame 300 (see FIG. 1B) upon completion of downward movement of the upper plate 60.

Meanwhile, a movement distance of the middle frame 200 corresponds to a position at which the entire surface of the second key input part 310 (see FIG. 1B) is seen when upward movement of the middle frame 200 is completed.

In addition, a movement distance of the middle frame 200 may be determined when a lower end of the middle frame 200 corresponds to a position of lower ends of the upper frame 100 (see FIG. 1B) and the main frame 300 (see FIG. 1B) upon completion of downward movement of the middle frame 200.

As described above, since the middle frame 200 can be moved by movement of the upper plate 60 only, it is possible to make operation convenient for a user by enabling the mobile communication terminal to be more readily opened and closed.

Moreover, it is possible to obtain a more compact mobile communication terminal when the terminal is closed.

Meanwhile, as shown in FIG. 16, a leaf spring 87 may be installed at an upper side of the main plate 80 in the longitudinal direction of the main plate 80.

Here, one side of the leaf spring 87 may be bent to form a resilient bending part 88.

In addition, a guide groove 48b is formed at a lower surface of the middle frame 200 to have a position, a width and a direction corresponding to the leaf spring 87, and stop grooves 48a are formed at both sides of the guide groove 48b.

Here, each of the stop grooves 48a may have a shape corresponding to the resilient bending part 88 to mount the resilient bending part 88, when either upward movement or downward movement of the middle frame 200 is completed.

As a result, it is possible to prevent unnecessary movement of the upper frame 100 (see FIG. 1B) as well as the middle frame 200. Therefore, when movement of the middle frame 200 is completed, it is possible to provide a sense of locking of the frames to a user.

Meanwhile, the leaf spring 87 may be separately manufactured to be coupled to the main plate 80 by a method such as welding, or may be integrally formed with the main plate 80 by pressing one side of the main plate 80.

Here, the leaf spring 87 is just an example of a resilient member for more smoothly moving the middle frame 200 and the upper plate 60, and is not definitive of the resilient member, which may be any of various springs such as a torsion spring or a coil spring.

A mobile communication terminal in accordance with the present invention has the advantageous effects listed below.

First, a two-stage slide module in which first and upper plates are slidably connected to front and rear surfaces of a middle frame is provided to implement a three-stage slide type mobile communication terminal.

Second, the respective frames can be interlocked with each other by a single driving link to reduce manufacturing cost of the mobile communication terminal.

Third, the single driving link is provided to readily control a sliding operation and simplify structure of the two-stage slide module, thereby remarkably increasing productivity.

Fourth, the single driving link is provided to implement a compact two-stage slide module of the three-stage slide type mobile communication terminal, thereby implementing a compact mobile communication terminal.

Fifth, an upper half part of the two-stage middle frame, an intermediate member, is installed in a lower part of an upper frame as a first stage, and a lower half part of the middle frame is installed in an upper part of a main frame so that the frames can be stably disposed even when the first and second frames of the three-stage slide type mobile communication terminal are fully slid upward.

Sixth, a display part, a first key input part, and a second key input part are installed at separate frames, respectively, to minimize the size of each frame, thereby maintaining a more compact state of the entire mobile communication terminal when the terminal is closed.

Seventh, the upper frame and the middle frame are coupled to the main frame and interlocked with each other by the driving link to allow a user to move the upper frame only so that the middle frame is moved together with the upper frame, thereby more conveniently opening and closing the mobile communication terminal.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A mobile communication terminal comprising:
an upper plate secured to a rear surface of an upper frame and having a first coupling shaft to which one side of a driving link is secured such that the upper frame is vertically guided;
a middle frame including a first guide provided at one side of a front surface thereof to guide the first coupling shaft of the upper plate, and first sliding means provided at both sides of a rear surface thereof; and
a main plate including a main frame secured to a rear surface thereof, sliding guide parts slidably guided along the first guide of the middle frame at both sides thereof, a second coupling shaft provided at one side of a front surface thereof and to which the other side of the driving link is secured, and a support means for the middle frame installed at the other side of the front surface,
wherein a second sliding means is provided to slide the upper plate, a fixing plate having an elongated hole formed at one side thereof in communication with the first guide of the middle frame is secured onto the front surface of the middle frame to vertically guide the first coupling shaft, a first key input part is provided at a lower part of the middle frame, and a second key input part is provided at a lower part of the main frame.

2. The mobile communication terminal according to claim 1, wherein the second sliding means comprises guide rails provided at both sides of the fixing plate secured onto the front surface of the middle frame to correspond to rail coupling parts provided at both sides of the upper plate.

3. The mobile communication terminal according to claim 1, wherein the first sliding means comprises sliding parts provided at both sides of the rear surface of the middle frame to correspond to the sliding guide parts provided at both sides of the main plate.

4. The mobile communication terminal according to claim 1, wherein the driving link is secured to the first coupling shaft of the upper plate at one side thereof, and secured to the second coupling shaft of the main plate at the other side thereof, wherein the driving link is formed of a single driving link disposed between the middle frame and the main plate.

5. The mobile communication terminal according to claim 1, wherein the support means is a leaf spring having a resilient bending part provided at one end to be selectively supported by first and second stop grooves formed at both sides of a guide groove formed at one side of the rear surface of the middle frame.

6. A mobile communication terminal comprising:
a main plate to which a main frame forming a body is coupled;
a middle frame coupled to the main plate to be slid in a longitudinal direction of the main frame, and having a first guide provided at one side thereof in the longitudinal direction and a second guide provided at a predetermined angle with respect to the first guide;
an upper plate installed at a mounting part provided on an upper surface of the middle frame to be slid in the longitudinal direction of the middle frame; and
a driving link hinged to the main plate at one end, and hinged to the upper plate at the other end, wherein a center part thereof is coupled to the second guide to move the middle frame to correspond to the movement direction of the upper plate upon movement of the upper plate, wherein the driving link comprises:
a first link installed at a lower side of the middle frame, and hinged to the first coupling shaft formed at the upper plate and passing through the first guide at one end to be rotated; and
a second link hinged to the main plate at one side thereof, and coupled to the first link and the second guide at the other side thereof to be interlocked with the first link and move the middle frame.

7. The mobile communication terminal according to claim 6, wherein the second link has a pressing protrusion provided at the other side, and the pressing protrusion is coupled to the second guide to move along the second guide and straightly move the middle frame using a rotation force of the second link.

8. The mobile communication terminal according to claim 6, wherein a first moving protrusion is provided at the other side of the first link, and a second moving protrusion is provided at the other side of the second link, wherein the first and second moving protrusions are coupled to second and first sliding grooves formed at center parts of the second link and the first link in the longitudinal direction thereof to move in the longitudinal direction and thereby vary the entire length of the first and second links.

9. The mobile communication terminal according to claim 6, wherein an upper frame having a display part is coupled to the upper plate, a first key input part is installed at a lower side of an upper surface of the middle frame, and a second key input part is installed at a lower side of the upper surface of the main frame, wherein the entire surface of the first key input part is exposed to the exterior when open movement of the upper frame is completed, and the entire surface of the second key input part is exposed to the exterior when open movement of the middle frame is completed.

* * * * *

UNITED STATES PATENT AND TRADEMARK OFFICE
CERTIFICATE OF CORRECTION

| | | |
|---|---|---|
| PATENT NO. | : 8,073,510 B2 | Page 1 of 1 |
| APPLICATION NO. | : 12/130035 | |
| DATED | : December 6, 2011 | |
| INVENTOR(S) | : Kyung Jin Min and Jae Woo Lee | |

It is certified that error appears in the above-identified patent and that said Letters Patent is hereby corrected as shown below:

IN THE SPECIFICATIONS:

Column 3,
Line 5, "main frame The" should read --main frame. The--.

Column 5,
Line 20, "main frame 200." should read --main frame 300.--.

Column 8,
Line 60, "operating horizontal and vertical" should read --operating the horizontal and vertical--.

Signed and Sealed this
Twelfth Day of June, 2012

David J. Kappos
*Director of the United States Patent and Trademark Office*